R. J. MULVEY.
SNAP FASTENER.
APPLICATION FILED AUG. 2, 1919.
1,402,006. Patented Jan. 3, 1922.
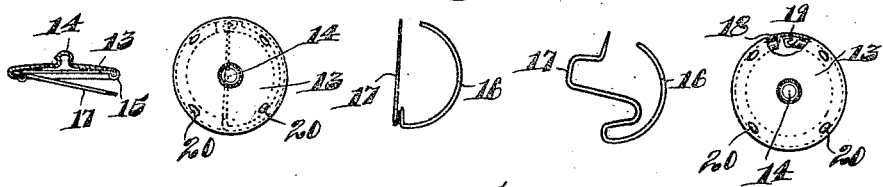
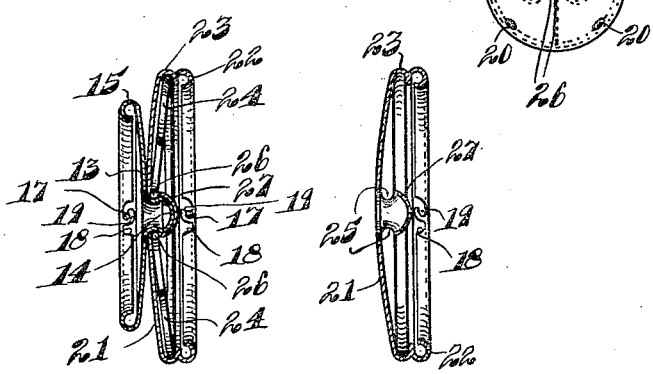
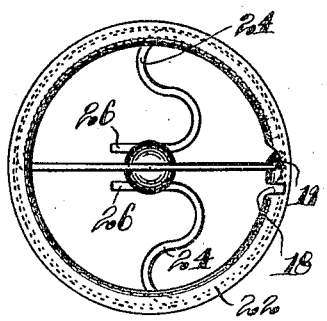
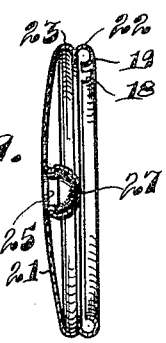
Witnesses:
C. E. Wessels
Thos. S. Donnelly
Inventor:
Robert J. Mulvey,
By Joshua R. H. Potts
Attorney.

UNITED STATES PATENT OFFICE.

ROBERT J. MULVEY, OF CHICAGO, ILLINOIS.

SNAP FASTENER.

1,402,006.   Specification of Letters Patent.   Patented Jan. 3, 1922.

Application filed August 2, 1919. Serial No. 314,824.

*To all whom it may concern:*

Be it known that I, ROBERT J. MULVEY, a citizen of the United States, and a resident of the city of Chicago, county of Cook, and State of Illinois, have invented certain new and useful Improvements in Snap Fasteners, of which the following is a specification.

My invention relates to new and useful improvements in snap fasteners and has for its object the provision of a snap fastener which may be readily attached to the fabric with which used.

Another object is the provision of a snap fastener which is durable in structure, economic in manufacture, and highly efficient in use.

Other objects will appear hereinafter.

The invention consists in the combinations and arrangements of parts hereinafter described and claimed.

The invention will be best understood by reference to the accompanying drawings forming a part of this specification, and in which, Fig. 1 is a top plan view of the male member of my invention.

Fig. 2 is a central vertical sectional view of the male member of my invention.

Fig. 3 is a top plan view of a male member of my invention with a part removed.

Fig. 4 is a side elevational view of the female member of my invention.

Fig. 5 is a top plan view of the female member of my invention.

Fig. 6 is a bottom plan view of the female member of my invention.

Fig. 7 is a vertical sectional view of the female member of my invention

Fig. 8 is a vertical sectional view of my invention in assembled position.

Fig. 9 is a detailed sectional view of the socket of the female member.

Figs. 10, 11, and 12 are perspective views of the fastening means used with my invention.

The approved form of construction consists of a male and a female member. The male member comprises a metallic disk 13 formed centrally on which, preferably by swaging, is a stud 14 having a reduced neck. The edge of the disk 13 is curled to form a groove in which the resilient wire member 16 is adapted to engage. Projecting diametrically from one end of the member 16 and having a pointed end is a suitable pin 17. At the juncture 17 with the member 16 a torsional spring member may be formed as shown in Fig. 10 or the member 17 may project directly diametrically upward from one end of the member 16 as shown in Fig. 12, or again the member 17 may be formed irregularly as shown in Fig. 11 for the purpose of more securely engaging the fabric into which the member 17 is intended to be thrust. At one portion of the member 15 is formed a suitable slot 18 in which the pointed end of the member 17 is adapted to engage. One of the adjacent ends of the curled portion 15 is formed with a catch portion as shown at 19 for the purpose of locking the member 17 in position. Provided upon the disk portion 13 are suitable slots 20 by means of which the disk may be sewed to the fabric with which it is used in which case the pin fastener member 16 with its co-operating portion 17 will be eliminated.

The female portion of the device consists of a disk 21, the edge of which is curled as at 23 to form a wire engaging groove. An additional portion 22 is secured to the member 23 and also grooved for the purpose of engaging member 16. Engaged in the groove 23 is a resilient wire locking member 24, the main portion of which is circular, the ends being formed substantially S-shaped as shown in Fig 6. The outer end 26 of this S-shaped portion is adapted to engage in a slot 25 formed at opposite sides of the cup shaped socket 27 which is formed in the disk 21. The portion 22 is provided with a similar slot 18 and a similar catch member 19 as already described. This female disk 21 is also provided with the opening 20 for the purpose of permitting the same to be sewed onto the garment with which used.

In the use of my invention the female disk is secured to the fabric with which used by means of the pin member 17. By the method of fastening which I have provided the disk is secured to the garment and the possibility of becoming detached is reduced to a minimum. The cooperating disk or the male portion of the fastener is likewise secured to the garment and the stud 14 is adapted to engage in the cup shaped socket which is formed in the female member, the enlarged head of the member 14 being curved on its upper surface upon being thrust into the socket 27 would force the ends 26 of the member 24 backward out of engagement with the slot 25. The ends 26 would, upon the head of the member 14 being thrust entirely within the socket 27, because of their resiliency, again engage in the slot 25 and against the reduced neck of the stud 14 thus securely locking the two members together.

While I have illustrated and described the preferred form of construction for carrying my invention into effect, this is capable of variation and modification without departing from the spirit of invention. I, therefore, do not wish to be limited to the precise details of construction set forth, but desire to avail myself of such variations and modifications as come within the scope of the appended claims.

Having described my invention, what I claim as new and desire to secure by Letters Patent is:—

1. A snap fastener having two elements adapted to detachably engage with each other, one of said elements comprising a disk, having the edges thereof curled to form a groove, a resilient wire pin having a circular portion engaged in said groove and having a diametrically extending pointed end; a cup shaped socket formed centrally in said disk and having slots on opposite sides; and a resilient wire member having a circular portion and substantially S-shaped ends adapted to engage in said slots; the other element comprising a disk having a stud formed centrally thereon and adapted to to be inserted in said socket and engage said S-shaped ends, substantially as described.

2. A snap fastener having two elements adapted to detachably engage with each other, each of said elements comprising a disk having the edge thereof curled to form a groove; a resilient wire pin having the circular portion engaged in each of said grooves and having a diametrically extending pointed end; a cup shaped socket formed centrally in one of said disks and having slots on opposite sides; a stud formed centrally on the other of said disks and adapted to engage in said socket; and means engaging in said slots securing said stud in said socket, substantially as described.

3. A snap fastener having two elements adapted to detachably engage with each other, each of said elements comprising a disk having the edge thereof curled to form a groove; a resilient wire pin having the circular portion engaged in each of said grooves and having a diametrically extending pointed end; a cup-shaped socket formed centrally in one of said disks and having slots in opposite sides; an additional groove formed in said socketed disk; and a curved member mounted in said additional groove and provided with ends which engage in said slots to secure said stud in said socket, substantially as described.

In testimony whereof I have signed my name to this specification in the presence of two subscribing witnesses.

ROBERT J. MULVEY.

Witnesses:
B. G. RICHARDS,
L. J. ERICKSON.